United States Patent
Hettinger et al.

[11] Patent Number: 6,073,081
[45] Date of Patent: Jun. 6, 2000

[54] METHOD AND DEVICE FOR MONITORING THE FILLING OF A CRYOTANK

[75] Inventors: Wolfgang Hettinger, Cologne; Friedrich Moser, Duisburg; Klaus Pehr, Stadtbergen; Joachim Tachtler, Ismaning, all of Germany

[73] Assignee: Messer Griesheim GmbH, Germany

[21] Appl. No.: 08/993,972

[22] Filed: Dec. 18, 1997

[30] Foreign Application Priority Data

Dec. 19, 1996 [DE] Germany .......................... 196 53 048

[51] Int. Cl.$^7$ ........................................ B65B 1/04
[52] U.S. Cl. ................................. 702/50; 702/55
[58] Field of Search .................... 702/50, 55, 25, 702/138, 140; 62/45.1; 364/528.16, 528.17; 340/614; 73/1.57, 19.05

[56] References Cited

U.S. PATENT DOCUMENTS

| | | | |
|---|---|---|---|
| 5,259,424 | 11/1993 | Miller et al. ................................. | 141/4 |
| 5,578,993 | 11/1996 | Sitabkhan et al. ....................... | 340/614 |
| 5,628,349 | 5/1997 | Diggins et al. .............................. | 141/3 |

FOREIGN PATENT DOCUMENTS

| | | | |
|---|---|---|---|
| 2 102 995 | 9/1983 | United Kingdom .............. | G01F 1/58 |
| WO 96 22915 | 1/1996 | WIPO .............................. | B65B 1/04 |

*Primary Examiner*—Timothy P. Callahan
*Assistant Examiner*—Linh Nguyen
*Attorney, Agent, or Firm*—Connolly Bove Lodge & Hutz LLP

[57] ABSTRACT

The invention provides a method and a device for monitoring the filling of a tank with a liquid, deep-frozen gas, in which the temperature and the pressure of the liquid gas in the tank are recorded, and the mass of the liquid gas in the tank is calculated from the temperature and the volume. In the prior art, a system with an overflow was used as a filling-level limitation, in which case the height of the overflow took the maximum increase in volume into account. With this limitation of the filling level, because the phase boundary is only determined independently of the density, the maximum permissible filling level must take into account the maximum possible increase in volume of the liquid gas. With the system according to the invention, better utilization of the tank volume is possible, because the increase in volume actually possible is taken into account based on the actually prevailing pressure and temperature state of the liquid gas introduced.

7 Claims, 1 Drawing Sheet

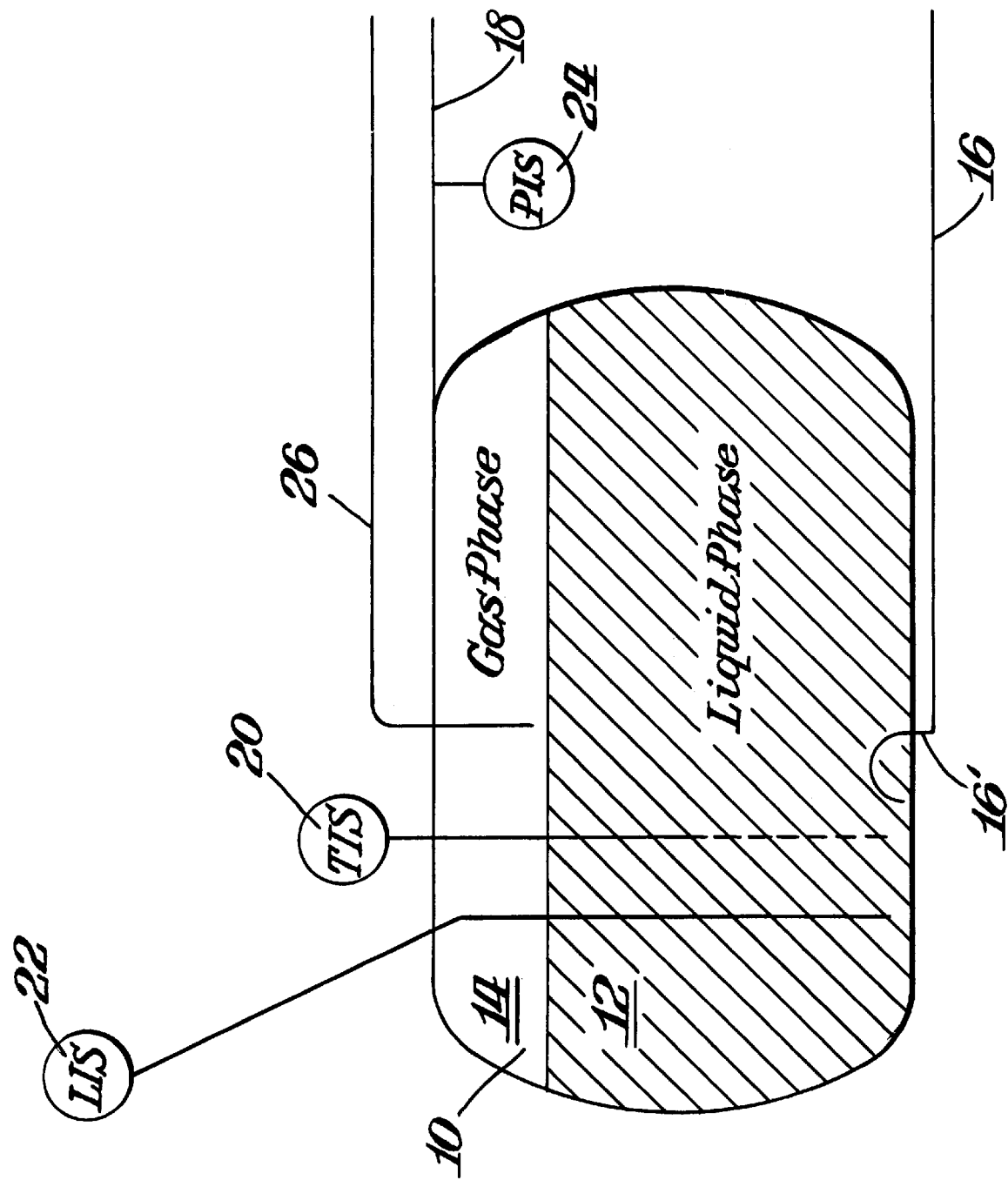

METHOD AND DEVICE FOR MONITORING THE FILLING OF A CRYOTANK

BACKGROUND OF THE INVENTION

The invention relates to a method and a device for monitoring the filling of a tank with a liquid gas.

Liquid-gas tanks, or cryotanks, have an insulated storage container in which liquefied, deep-frozen gas can be stored in a pressurized state. Examples of liquid compressed gases are liquid hydrogen ($LH_2$), liquefied natural gas (LNG) and liquid nitrogen ($LN_2$). The low temperature of the liquefied gases is maintained over prolonged periods by means of a vacuum insulation of the storage container. Cryotanks are used, for example, as fuel tanks in automotive engineering.

There are various standards which prescribe a filling-level limitation for liquid-gas storage. For example in ISO/WD 13985 of Dec. 15, 1994 for liquid hydrogen tanks, it is stipulated that the tank must be fitted with a filling-level measuring device. This is intended to ensure that the tank is not overfilled. The aim is to end the filling operation at 98% of the maximum permissible filling level. In accordance with the standard TRG 103 for liquid, deep-frozen compressed gases, only so much liquid gas may be charged into a tank that, at the activation pressure of the pressure valves provided on the tank, the latter is filled to a maximum of 95%.

Since the pressure and the volume of the liquid gas increase as the temperature rises, when filling the storage container care must be taken in any case to ensure that the maximum filling level is not exceeded either when the maximum permissible internal storage pressure is reached. The maximum volume of liquid gas which may be charged into a tank thus depends on the pressure and temperature of the liquid gas during filling and on the theoretically possible increase in volume until the maximum tank pressure is reached during operation.

In the prior art, a system with an overflow has previously been used as a filling-level limitation, in which case the height of the overflow took the maximum increase in volume into account. With this type of registering or limiting of the filling level, because the phase boundary is only determined independently of the density, the maximum permissible filling level must be set to allow for the maximum possible increase in volume of the liquid gas. If, for example, supercooled liquid hydrogen at the boiling temperature at 1 bar is charged into the tank at a pressure of 15 bar, the tank may only be filled to a maximum of 65%. When the liquid hydrogen gradually assumes its state of equilibrium and heats up to the boiling temperature at 15 bar, its volume expands under ambient pressure to approximately 95% of the tank volume.

Since the conventional filling-level limitation with an overflow always takes into account the theoretically maximum possible increase in volume of the liquid gas, accordingly less mass can be stored than if the increase in volume actually possible were to be taken into account based on the actually prevailing pressure and temperature condition of the liquid gas introduced.

For instance, the maximum permissible filling quantity of liquid hydrogen in a 140-liter tank at a permissible pressure of 6 bar is calculated as 7.8 kg, corresponding to 110 liters at a boiling-point pressure of 1 bar. Since only the volume in the storage tank is measured and the theoretically maximum possible increase in volume for the increase in pressure from the ambient pressure level to the maximum permissible pressure has to be taken into account, at a boiling-point pressure of 3 bar, for example, only 7.2 kg and, at a boiling-point pressure of 6 bar, only 6.5 kg can be stored.

SUMMARY OF THE INVENTION

The object of the invention is therefore to specify a device and a method for filling a tank with a liquid gas, which provide optimum utilization of the storage capacity of the tank.

According to the invention, provision is made to record the temperature and the volume of the liquid gas in the tank and, from this, to calculate the mass of the liquid gas in the tank. The liquid temperature and the liquid pressure have a known functional relation with one another along the boiling-point curve. Although the liquid gas is not in the state of equilibrium during filling, it is possible to determine the liquid mass with sufficient accuracy if the boiling-point pressure corresponding to the temperature measured is assumed. By recording the liquid temperature, the volumetric measurement, which is derived, for example, from a filling-level probe, can thus be converted to a mass, by calculating the boiling-point pressure from the temperature and, from the latter, the density of the liquid gas (depending on the pressure and temperature). An even more precise determination of the mass of liquid gas results if the pressure of the liquid gas is also recorded during filling and is used directly for the calculation of the mass.

For this purpose, a processing unit is provided, which provides, on the one hand, an indicator for the filling level of the liquid gas in the tank and, on the other hand, can monitor a filling plant for filling the cryotank with liquid gas. The processing unit compares the current mass-related degree of filling of the tank with a maximum value stored in the processing unit and sends a switch-off command to the filling plant when the maximum value has been reached.

In a preferred embodiment, the processing unit constantly checks the plausibility of the temperature measurement during the operation of the storage tank. For this purpose, in addition to the temperature, the boiling-point pressure of the liquid gas contained in the storage tank is recorded, and the temperature and pressure are checked against the boiling-point curve stored in the processing unit for the liquid gas. After the tank has been operated for a specific time, in particular when it is used as a motor vehicle tank, the traveling movement causes the liquid gas to reach the state of equilibrium, at which the pressure and temperature of the gas have precisely that relationship determined by the boiling-point curve. If it is found that the temperature measured does not coincide with the corresponding pressure from the boiling-point curve, an incorrect temperature measurement is diagnosed, and the method for monitoring the filling of the tank based on the mass of the liquid gas in the tank is blocked. An error message is emitted, and the filling operation is then switched off, as is known from the prior art, at a maximum filling level stored in the processing unit. This filling level corresponds to the minimum boiling-point pressure.

As a safety measure in the event of a failure or malfunction of the temperature measuring device, the filling level is then limited according to the overflow principle at a filling level which takes into account the maximum increase in volume at a minimum boiling-point pressure. This "overflow" filling-level limitation can be carried out electronically by the processing unit. A mechanical filling-level limitation with an overflow which can be connected up may be provided as an alternative or in addition.

One of the main difficulties of storing liquefied natural gas, hydrogen and the like consists in the complex storage technology, compared to conventional fuels. The method according to the invention and the device for monitoring the filling of a tank with liquid gas enable optimum utilization of the storage capacity of the liquid-gas tank. This results in a considerable advantage in storage utilization compared to the prior art.

THE DRAWINGS

The invention is described in greater detail below by way of a preferred exemplary embodiment with reference to the drawing, in which the single figure shows:

A liquid-gas tank with a device for monitoring the filling level of the tank according to the invention.

DETAILED DESCRIPTION

The figure illustrates an embodiment of the device according to the invention for monitoring the filling of a tank. A cryotank 10 contains deep-frozen, liquefied gas 12, for example liquefied natural gas or liquid hydrogen. Above the liquid phase 12, there is a gas phase 14 of the cold gas. The cryotank 10 is surrounded by a vacuum insulation shell (not shown). A removal line 16 with a rising-pipe section 16' is provided for the removal of liquid gas. This line 16 can also be used for supplying gas. Gaseous cold gas is conducted away via a removal line 18. Furthermore, the figure shows a temperature sensor 20, a filling-level sensor 22 and a pressure pick-up 24. Finally, an overflow pipe 26 is also provided as a mechanical filling-level limitation.

The pipes 16, 18 and 26 for supplying and removing liquid, for removing gas and for the overflow respectively have control or shut-off valves (not shown). The invention provides for the gas line 18 and the overflow line 26 to be closed and the liquid line 16 to be open during the filling of the tank in normal operation. During the filling operation, the temperature sensor 20 and the filling-level sensor 22 continuously record the temperature and the filling level of the liquid gas 12 in the tank 10. They pass on this information to a processing unit (not shown). Based on the known boiling-point characteristic curve for the liquid gas, the processing unit determines the boiling-point pressure of the liquid gas from the temperature measured. If the pressure and temperature of the liquid gas 12 are known, its density can easily be calculated therefrom. The geometric dimensions of the tank 10 are stored in the processing unit, which means that the volume of liquid gas in the tank 10 can be calculated from the filling level determined by the filling-level sensor 22. From the density and the volume of the gas, the processing unit then calculates the mass of the liquid gas in the tank 10. When a maximum value is reached, which is always constant irrespective of the temperature and the pressure of the gas, a shut-off valve in the line 16 is closed, and the filling of the tank 10 is stopped. The limitation of the filling operation by means of the mass-related maximum value results in the maximum permissible filling level in the tank 10 for any filling state (pressure and temperature) of the liquid gas, as has already been explained.

In a modified embodiment of the invention, the mass of the liquid gas in the tank is not only determined on the basis of the temperature and the filling level of the gas, but the pressure of the gas introduced is also measured and used for the calculation of the mass.

The device according to the invention for monitoring the filling of a tank thus always limits the filling volume, and the filling height, of the liquid gas 12 in the tank to a value which takes into account the actual increase in volume up to the permissible maximum pressure in the tank, for example 6 bar.

addition, the device according to the invention carries out continuous monitoring of the temperature measurement. For this purpose, the temperature of the liquid gas 12 is continuously recorded by the temperature sensor 20 and the pressure in the tank 10 by the pressure pick-up 24. The pressure and temperature are compared using the boiling-point characteristic curve valid for the respective liquid gas. As explained, the liquid gas is in the state of equilibrium after a specific period of operation, i.e. it has the boiling-point pressure and boiling temperature. If there is a discrepancy between the temperature and the boiling-point characteristic curve which corresponds to the pressure recorded, a malfunction of the temperature sensor 20 is diagnosed, and the monitoring device according to the invention is switched off. If the tank 10 is required to be filled with liquid gas after the malfunction was detected, this can only be done up to a fixed predetermined filling level which takes into account the theoretically maximum possible increase in volume of the liquid gas, i.e. generally an expansion of the gas at a transition from the maximum filling pressure (e.g. 15 bar) to the ambient pressure (1 bar). This limitation to a fixed maximum filling level can either be carried out by the processing unit on the basis of a signal from the filling-level sensor 22 or as a mechanical filling-level limitation by connecting in the overflow 26.

The features disclosed in the above description, the drawing and the claims may be important both individually and in any desired combination for the implementation of the invention.

What is claimed is:

1. A device for monitoring the filling of a tank with a liquid gas, having a temperature measuring device in the tank for recording the temperature of the liquid gas in the tank, a filing-level measuring device in the tank for determining the filling level of the liquid gas in the tank, a processing unit operatively connected for receiving information from the measuring devices for calculating the mass of the liquid gas in the tank from the temperature and the filling level, a pressure measuring device communicating with the tank for recording the pressure of the liquid gas in the tank, which pressure measuring device is connected to the processing unit, wherein the processing unit has a comparator in order to compare the mass of the liquid gas with a threshold value and to emit a signal when the threshold value has been reached.

2. The device as claimed in claim 1, which has a device for displaying the filling level of the liquid gas in the tank.

3. The device as claimed in claim 2, wherein the gas is a deep-frozen compressed gas, in particular liquid hydrogen ($LH_2$), liquefied natural gas (LNG) or liquid nitrogen ($LN_2$).

4. The device as claimed in claim 1, which has an overflow device selectively connected with the tank.

5. A device for monitoring the filling of a tank with a liquid gas, having a temperature measuring device in the tank for recording the temperature of the liquid gas in the tank, a filing-level measuring device in the tank for determining the filling level of the liquid gas in the tank, a processing unit operatively connected for receiving information from the measuring devices for calculating the mass of the liquid gas in the tank from the temperature and the filling level, and wherein the processing unit has a comparator in order to compare the mass of the liquid gas with a threshold value and to emit a signal when the threshold value has been reached.

6. The device as claimed in claim 5, which as a device for displaying the filling level of the liquid gas in the tank.

7. The device as claimed in claim 5, wherein the gas is a deep-frozen compressed gas, in particular liquid hydrogen ($LH_2$), liquefied natural gas (LNG) or liquid nitrogen ($LH_2$).

* * * * *

UNITED STATES PATENT AND TRADEMARK OFFICE
CERTIFICATE OF CORRECTION

PATENT NO. : 6,073,081
APPLICATION NO. : 08/993972
DATED : June 6, 2000
INVENTOR(S) : Wolfgang Hettinger et al.

Page 1 of 1

It is certified that error appears in the above-identified patent and that said Letters Patent is hereby corrected as shown below:

"[73] Assignee: Messer Griesheim GmbH, Germany" should be --<u>Messer Grieshelm GmbH, Germany and Bayerische Motoren Werke AG, Germany</u>--.

Signed and Sealed this

Fourth Day of November, 2008

JON W. DUDAS
*Director of the United States Patent and Trademark Office*

UNITED STATES PATENT AND TRADEMARK OFFICE
CERTIFICATE OF CORRECTION

PATENT NO.        : 6,073,081
APPLICATION NO.   : 08/993972
DATED             : June 6, 2000
INVENTOR(S)       : Wolfgang Hettinger et al.

It is certified that error appears in the above-identified patent and that said Letters Patent is hereby corrected as shown below:

"[73] Assignee: Messer Griesheim GmbH, Germany" should be --Messer Griesheim GmbH, Germany and Bayerische Motoren Werke AG, Germany--.

This certificate supersedes the Certificate of Correction issued November 4, 2008.

Signed and Sealed this

Twenty-ninth Day of June, 2010

David J. Kappos
*Director of the United States Patent and Trademark Office*